(12) United States Patent
Shah et al.

(10) Patent No.: US 6,637,500 B2
(45) Date of Patent: Oct. 28, 2003

(54) CORES FOR USE IN PRECISION INVESTMENT CASTING

(75) Inventors: Dilip N. Shah, Glastonbury, CT (US); James Thompson Beals, West Hartford, CT (US); John Joseph Marcin, Jr., Marlborough, CT (US); Stephen Douglas Murray, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/001,780

(22) Filed: Oct. 24, 2001

(65) Prior Publication Data

US 2003/0075300 A1 Apr. 24, 2003

(51) Int. Cl.⁷ ............................. B22C 9/10; B22C 21/14
(52) U.S. Cl. ........................ 164/369; 164/397; 148/404
(58) Field of Search ............................... 164/516, 369, 164/370, 397, 398, 399, 411, 35

(56) References Cited

U.S. PATENT DOCUMENTS

| 4,287,932 A | * | 9/1981 | Schneider ................. 164/516 |
| 4,487,246 A | * | 12/1984 | Frasier ...................... 164/32 |
| 4,596,281 A | * | 6/1986 | Bishop ....................... 164/32 |
| 4,712,605 A | * | 12/1987 | Sasaki et al. ............. 164/516 |
| 4,811,778 A | * | 3/1989 | Allen et al. ............... 164/516 |
| 5,599,166 A | | 2/1997 | Deptowicz |
| 5,641,014 A | * | 6/1997 | O'Connor et al. ........ 164/516 |
| 5,947,181 A | * | 9/1999 | Davis ........................ 164/132 |
| 6,119,761 A | * | 9/2000 | Anazawa et al. ........... 164/35 |
| 6,530,416 B1 | * | 3/2003 | Tiemann .................... 164/137 |

FOREIGN PATENT DOCUMENTS

| EP | 0533385 A1 | 9/1992 |
| EP | 0715913 A1 | 12/1994 |
| JP | 63040639 | 2/1988 |

OTHER PUBLICATIONS

Copy of European Search Report Serial No. EP 02 25 7358 dated Feb. 21, 2003.

* cited by examiner

*Primary Examiner*—M. Alexandra Elve
*Assistant Examiner*—Kevin L McHenry
(74) *Attorney, Agent, or Firm*—McCormick, Paulding & Huber LLP

(57) ABSTRACT

Concepts for fabricating improved cores for investment casting are described. The cores are composite which include refractory metal elements and ceramic elements. The refractory metal elements are provided to enhance the mechanical properties of the core and/or to permit the fabrication of cores having shapes and geometries that could not otherwise be achieved. In one embodiment, the entire core may be made of refractory metal components. The cores may be used to investment cast gas turbine superalloy components.

14 Claims, 4 Drawing Sheets

CORES FOR USE IN PRECISION INVESTMENT CASTING

BACKGROUND OF THE INVENTION

1. Field of the Invention

The present invention relates to investment casting cores, and in particular to investment casting cores which are formed at least in part from refractory metals.

2. Background Information

Investment casting is a commonly used technique for forming metallic components having complex geometries, especially hollow components, and is used in the fabrication of superalloy gas turbine engine components. The invention will be described in respect to the production of superalloy castings, however it will be understood that the invention is not so limited.

Gas turbine engines are widely used in aircraft propulsion, electric power generation, and ship propulsion. In all gas turbine engine applications, efficiency is a prime objective.

Improved gas turbine engine efficiency can be obtained by operating at higher temperatures, however current operating temperatures are at such a level that, in the turbine section, the superalloy materials used have limited mechanical properties. Consequently, it is a general practice to provide air cooling for components in the hottest portions of gas turbine engines, typically in the turbine section. Cooling is provided by flowing relatively cool air from the compressor section of the engine through passages in the turbine components to be cooled. It will be appreciated that cooling comes with an associated cost in engine efficiency, consequently, there is a strong desire to provide enhanced specific cooling, maximizing the amount of cooling benefit obtained from a given amount of cooling air.

Referring to FIG. 1, a gas turbine engine 10 includes a compressor 12, a combustor 14, and a turbine 16. Air 18 flows axially through the sections 12, 14, and 16 of the engine 10. As is well known in the art, air 18, compressed in the compressor 12, is mixed with fuel which is burned in the combustor 14 and expanded in the turbine 16, thereby rotating the turbine 16 and driving the compressor 12.

Both the compressor 12 and the turbine 16 are comprised of rotating and stationary airfoils 20, 22, respectively. The airfoils, especially those disposed in the turbine 16, are subjected to repetitive thermal cycling under widely ranging temperatures and pressures. To avoid thermal damage to the airfoils, each airfoil 20 includes internal cooling.

Referring to FIG. 2, the airfoil 20 includes a leading edge 26 and a trailing edge 28 extending from a root end 30 to a tip 32 thereof and a platform 34. A leading edge cooling passage 40 is formed within the leading edge 26 of the airfoil 20 having radially extending, connected channels 42–44 and a leading edge inlet 46, formed within the platform 34 and in fluid communication with the channel 42. A plurality of leading edge crossover holes 48 formed within a leading edge passage wall 50 separating the channel 44 from a leading edge exhaust passage 52, allow the cooling air from the channel 44 to flow into the leading edge exhaust passage 52. A trailing edge cooling passage 56 is formed within the trailing edge 28 of the airfoil 20 having radially extending connected channels 58–60 and a trailing edge inlet 62 formed within the platform 34 and in fluid communication with the channel 58. A first plurality of trailing edge crossover holes 66 is formed within a first trailing edge wall 68 and a second plurality of trailing edge crossover holes 72 is formed within a second trailing edge wall 74 to allow cooling air from channel 58 to flow through an intermediate passage 78 to a plurality of trailing edge slots 80.

A ceramic core 120, as depicted in FIGS. 3 and 4, is used in the manufacturing process of the airfoils 20 and defines the hollow cavities therein. A ceramic core leading edge 126 and a ceramic core trailing edge 128 correspond to the leading edge 26 and trailing edge 28 in the airfoil 20, respectively. A ceramic core root 130 and a tip 132 correspond to the airfoil root 30 and tip 32, respectively. Ceramic core passages 140, 156 with channels 142–144, 158–160, and inlets 146, 162 respectively, correspond to passages 40, 56 with channels 42–44, 58–60 and inlets 46, 62, of the airfoil, respectively. Passages 52 and 78 of the airfoil correspond to channels 152 and 178 in the ceramic core. Pluralities of fingers 148, 166, 172 in the core 120 correspond to the plurality of crossover holes 48, 66, 72 in the airfoil 20, respectively. A core tip 190 is attached to the core passages 140, 156 by means of fingers 182–185, to stabilize the core 120 at the tip 132. An external ceramic handle 194 is attached at the core trailing edge 128 for handling purposes. A core extension 196 defines a cooling passage at the root to the airfoil 20. Centerlines 197–199 extend radially through each row of fingers 148, 166, 172, respectively.

While turbine blades and vanes are some of the most important components that are cooled, other components such as combustion chambers and blade outer air seals also require cooling, and the invention has application to all cooled turbine hardware, and in fact to all complex cast articles.

Currently cores such as that shown in FIGS. 3 and 4 are fabricated from ceramic materials but such ceramic cores are fragile, especially the advanced cores used to fabricate small intricate cooling passages in advanced hardware. Current ceramic cores are prone to warpage and fracture during fabrication and during casting. In some advanced experimental blade designs casting yields of less than 10% are achieved, principally because of core failure.

Conventional ceramic cores are produced by a molding process using a ceramic slurry and a shaped die; both injection molding and transfer-molding techniques may be employed. The pattern material is most commonly wax although plastics, low melting-point metals, and organic compounds such as urea, have also been employed. The shell mold is formed using a colloidal silica binder to bind together ceramic particles which may be alumina, silica, zirconia and alumina silicates.

The investment casting process to produce a turbine blade, using a ceramic core, will be explained briefly here. A ceramic core having the geometry desired for the internal cooling passages is placed in a metal die whose walls surround but are generally spaced away from the core. The die is filled with a disposable pattern material such as wax. The die is removed leaving the ceramic core embedded in a wax pattern. The outer shell mold is then formed about the wax pattern by dipping the pattern in a ceramic slurry and then applying larger, dry ceramic particles to the slurry. This process is termed stuccoing. The stuccoed wax pattern, containing the core, is then dried and the stuccoing process repeated to provide the desired shell mold wall thickness. At this point the mold is thoroughly dried and heated to an elevated temperature to remove the wax material and strengthen the ceramic material.

The result is a ceramic mold containing a ceramic core which in combination define a mold cavity. It will be understood that the exterior of the core defines the passageway to be formed in the casting and the interior of the shell mold defines the external dimensions of the superalloy casting to be made. The core and shell may also define casting portions such as gates and risers which are necessary for the casting process but are not a part of the finished cast component.

After the removal of the wax, molten superalloy material is poured into the cavity defined by the shell mold and core assembly and solidified. The mold and core are than removed from the superalloy casting by a combination of mechanical and chemical means.

As previously noted, the currently used ceramic cores limit casting designs because of their fragility and because cores with dimensions of less than about 0.012–0.015 inches cannot currently be produced with acceptable casting yields.

Accordingly, it is an object of this invention to provide cores for investment casting which have improved mechanical properties.

It is another object of the invention to provide cores which can be made in thinner thicknesses than current ceramic cores.

It is another object of the invention to provide cores which are resistant to thermal shock during the casting process.

It is another object of the invention to provide cores which have geometries and features which cannot be achieved in ceramic cores.

It is another object of the invention to provide cores which allow rapid implementation of complex design changes without the need to employ costly tooling and processes.

DISCLOSURE OF INVENTION

To achieve the foregoing objectives and to provide other benefits, in accordance with the present invention, cores are described which include refractory metal elements.

Refractory metals include molybdenum, tantalum, niobium, tungsten, and alloys thereof. For purposes of this invention, the term "refractory metals" will also be understood to include intermetallic compounds based on the foregoing refractory metals.

According to one embodiment of the invention, wires of these refractory metals are embedded in ceramic cores to provide improved mechanical properties.

In accordance with another embodiment of the invention, a ceramic core may be formed about a sheet of refractory material which has previously been cut and shaped to conform to at least a portion of the required core geometry.

In accordance with another embodiment of the invention a refractory wire or sheet metal element may form a portion of a core and may be exposed to the molten metal during the casting process.

In accordance with embodiments of the invention, the refractory metal core components may be coated with one or more layers of protective material to prevent the refractory constituents from interacting with the molten metal during casting.

In accordance with another embodiment of the invention, investment casting cores may be fabricated from multiple ceramic and refractory metal components.

The present invention may be understood by reference to the following drawings taken with the following detailed description.

DETAILED DESCRIPTION OF THE INVENTION

Figure 1:
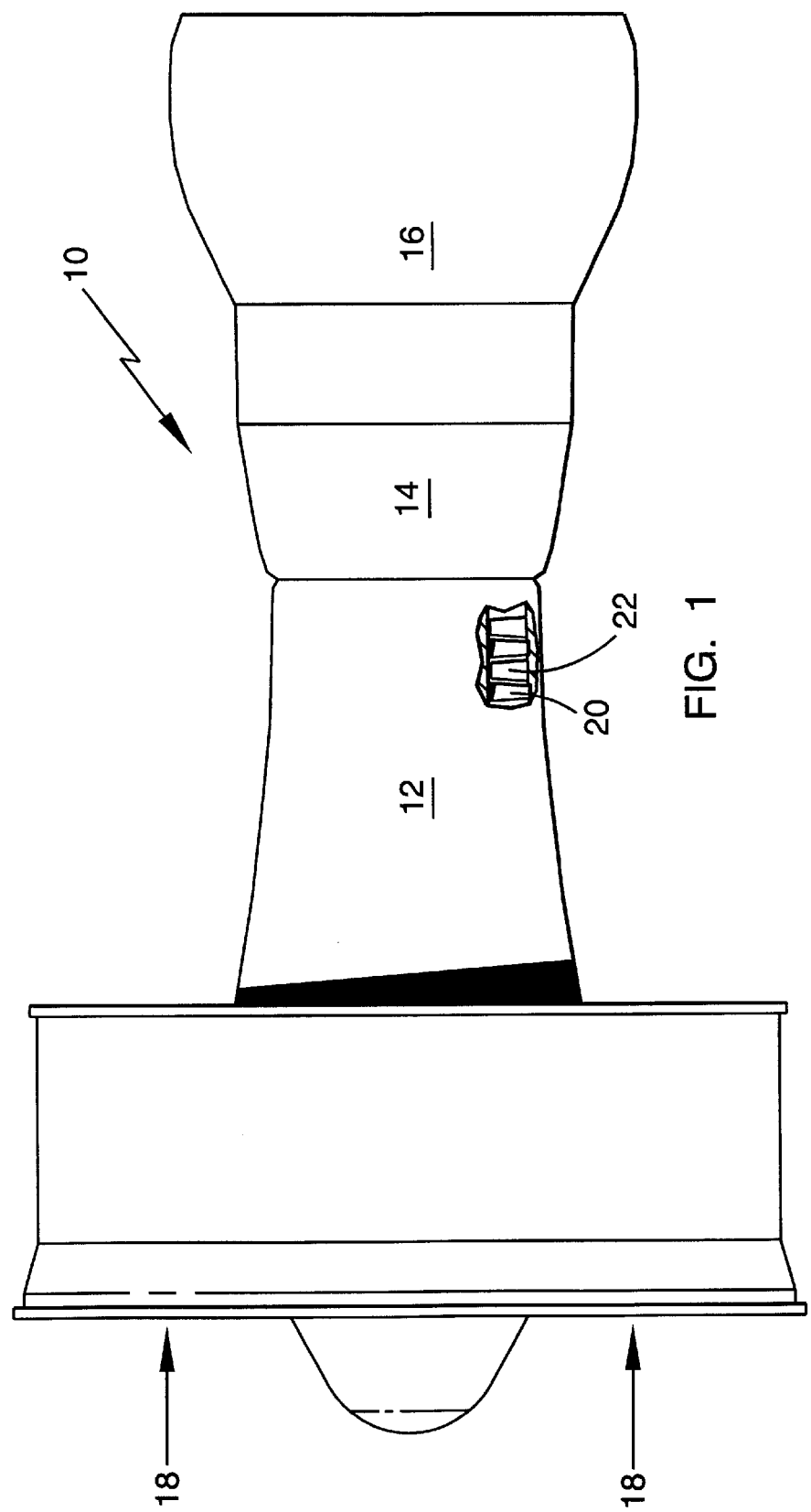
FIG. 1 is a simplified, broken away elevation of a gas turbine engine.
Figure 2:
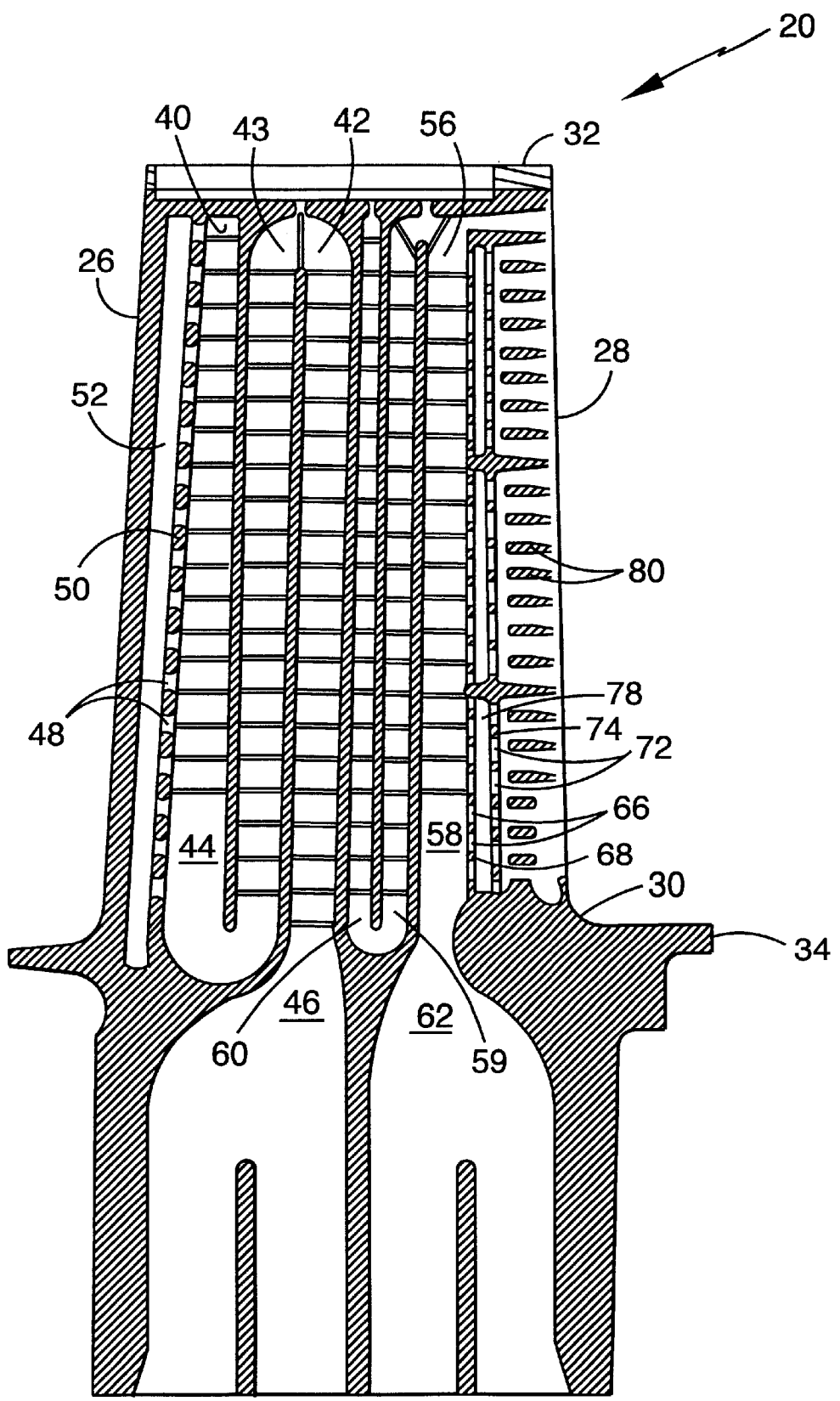
FIG. 2 is an enlarged, cross-sectional elevation of an airfoil of the gas turbine engine of FIG. 1.
Figure 4:
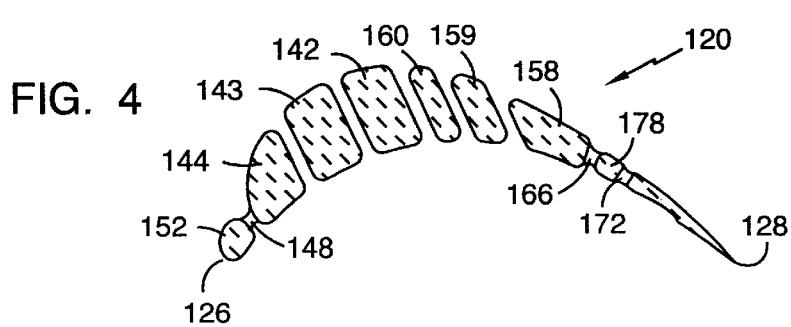
FIG. 4 is a cross-sectional elevation of the ceramic core taken in the direction of 4—4 in FIG. 3.
Figure 3:
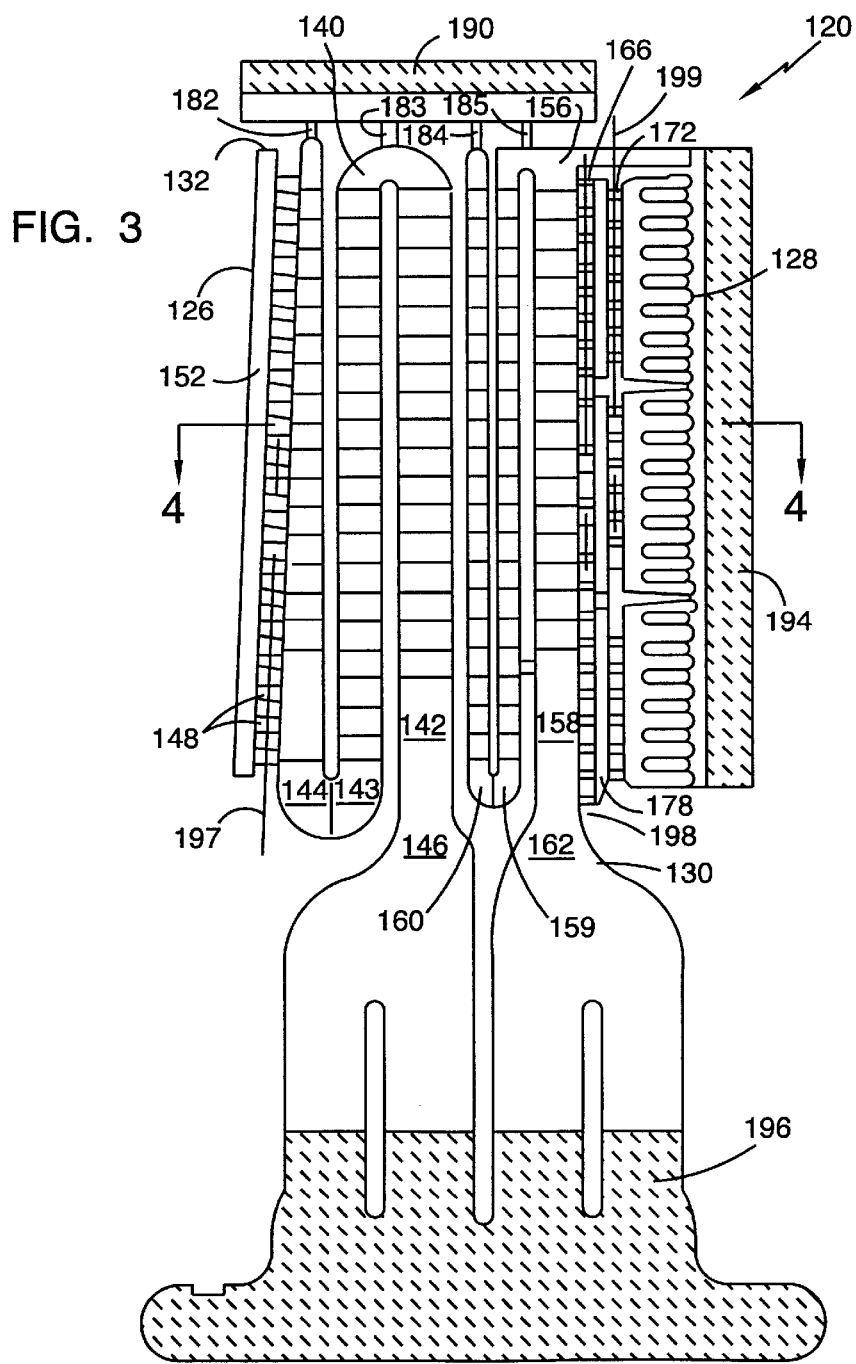
FIG. 3 is an elevation of a ceramic core defining cooling passages for manufacturing of the airfoil of FIG. 2 according to the present invention.
Figure 5:
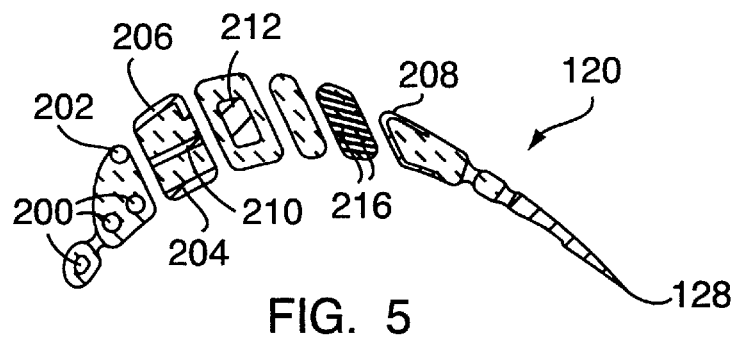
FIG. 5 shows a cross sectional elevation of a ceramic core taken in the direction of 4—4, illustrating embodiments of the invention

As previously noted, conventional ceramic cores are currently a limiting factor in the design of advanced complex superalloy articles because they impose dimensional limitations on casting design. FIG. 5 illustrates various embodiments of the present invention. FIG. 5 shows the cross sectional elevation as in FIG. 4 with various illustrative refractor metal elements.

Referring now to FIG. 5 which illustrates embodiments of the invention, one or more refractory metal wires 200 may be embedded within the ceramic core to provide strength and resistance to cracking and warping. Although shown as circular in cross section, other wire cross sections may be employed.

Wire 202 may also be located adjacent the surface ceramic of core 120 and may provide a core surface contour.

Refractory metal sheet elements may also be utilized. Refractory metal sheet elements 204 may be located at the surface of a core element; or a shaped refractory sheet element 206 may be shaped to form a radius and corner of a core element; similarly, a refractory metal element 208 may form three sides and two corners of a ceramic core element. Refractory sheet metal element 210 may be located largely within a core element, extending from one surface to another, or refractory core element 212 may be located entirely within a core element.

The trailing edge 128 or any one or more core elements of the core 120 may be formed entirely from a refractory metal sheet to provide a thinner core element with usable properties than could otherwise be produced from ceramic.

Core elements or entire cores may also be built up from multiple shaped sheets 216 of refractory metals joined using various methods including resistance welding, T1G welding, brazing, and diffusion bonding.

The previously described embodiments are illustrative. The core designer may use any one or more of these embodiments in a core design, utilizing them as appropriate in view of the specific core design.

Figure 6:
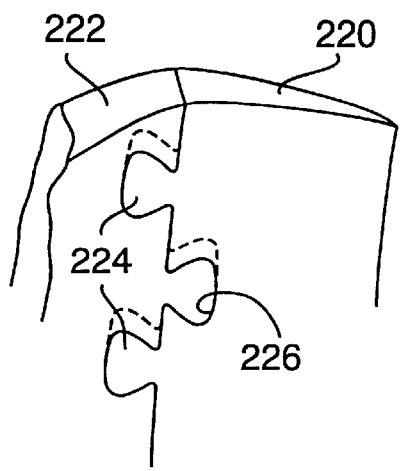
FIG. 6 shows mechanical attachment schemes.

FIG. 6 shows how a thin refractory sheet metal trailing edge core component can be used to form a part of an overall investment casting core. The thin refractory metal element 220 can be attached to the ceramic portion 222 by providing a refractory metal component with regions 224 which protrude or recessed pockets 226 injecting the ceramic around this protruding element, and/or into the pockets to provide a mechanical lock between the ceramic element and the refractory metal element.

Figure 7:
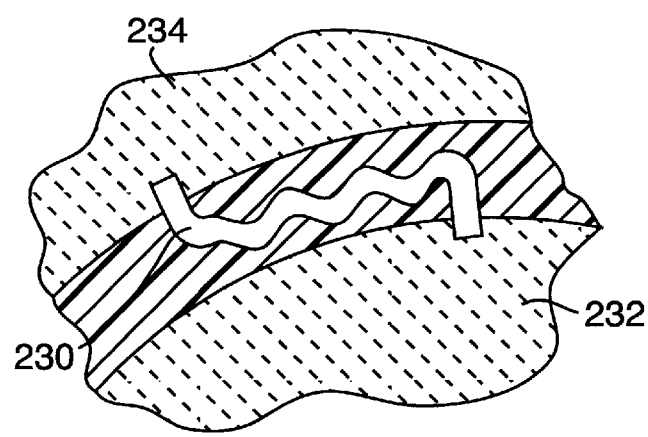
FIG. 7 shows a refractory metal core detail for forming a convoluted cooling passage.

FIG. 7 illustrates how refractory metal core elements 230 can be used to form small diameter cooling holes within the wall of an airfoil. In FIG. 7, refractory element 230 extends between the core 232 and the shell 234. Refractory element 230 will form a convoluted cooling passage in the wall of a turbine component, a cooling passage which could not be formed by casting using conventional core technology.

The refractory alloys of Mo, Cb, Ta and W are commercially available in standard shapes such as wire and sheet which can be cut as needed to form cores using processes such as laser cutting, shearing, piercing and photo etching. The cut shapes can be deformed by bending and twisting. The standard shapes can be corrugated or dimpled to produce passages which induce turbulent airflow. Holes can be punched into sheet to produce posts or turning vanes in passageways.

Refractory metals are generally prone to oxidize at elevated temperatures and are also somewhat soluble in molten superalloys. Accordingly, refractory metal cores require a protective coating to prevent oxidation and erosion by molten metal. Refractory metal core elements can be coated with one or more thin continuous adherent ceramic layers for protection. Suitable ceramics include silica, alumina, zirconia, chromia, mullite and hafnia. Preferably, the coefficient of thermal expansion (C.T.E.) of the refractory metal and the ceramic are similar. Ceramic layers may be applied by CVD, PVD, electrophoresis, and sol gel techniques.

Multiple layers of different ceramics may be employed. Individual layers will typically be 0.1 to 1 mil thick.

Metallic layers of Pt, other noble metals, Cr and Al may be applied to the refractory metal elements for oxidation protection, in combination with a ceramic coating for protection from molten metal erosion.

Refractory metal alloys and intermetallics such as Mo alloys and $MoSi_2$, respectively, which form protective $SiO_2$ layers may also be preferred. Such materials are expected to allow good adherence of a non-reactive oxide such as alumina. It is understood that silica though an oxide is very reactive in the presence of nickel based alloys and must be coated with a thin layer of other non-reactive oxide. However, by the same token silica readily diffusion bonds with other oxides such as alumina forming mullite.

For purposes of the invention, metals containing solid solution strengtheners, precipitation strengtheners and dispersion strengtheners are classed as alloys.

Alloys of Mo include TZM (0.5% Ti, 0.08% Zr, 0.04% C, bal Mo), and lanthanated Molybdenum Alloys of W include W-38% Re.

The previously noted alloys are by way of example and are not intended to be limiting.

After the casting process is complete the shell and core are removed. The shell is external and can be removed by mechanical means to break the ceramic away from the casting, followed as necessary by chemical means usually involving immersion in a caustic solution.

In the prior art, ceramic cores are usually removed using caustic solutions, often under conditions of elevated temperatures and pressures in an autoclave.

To the extent that the invention cores are partially ceramic, the same caustic solution core removal techniques may be employed.

The refractory metal portion of the invention cores may be removed from superalloy castings by acid treatments. For example, to remove Mo cores from a nickel superalloy, we have used 40 parts $HNO_3$ 30 parts $H_2SO_4$, bal $H_2O$ at temperatures of 60–100° C.

For refractory metal cores of relatively large cross sectional dimensions thermal oxidation can be used to remove Mo which forms a volatile oxide. In Mo cores of small cross sections, we have found thermal oxidation to be ineffective.

As noted, cores based on the metals Mo, Nb, W and Te and alloys thereof, along with intermetallic compounds based on these metals are preferred.

What is claimed is:

1. A composite core for use in an investment casting process to produce an internal passage in an investment casting which comprises:
   a) at least one ceramic element
   b) at least one refractory metal element attached to said at least one ceramic element, said at least one refractory metal element being coated with at least one oxidation resistant coating, said coated refractory metal element forming at least a portion of the surface of the composite core.

2. A composite core as in claim 1 wherein said ceramic element is an oxide ceramic.

3. A composite core as in claim 1 wherein said refractory metal element comprises at least one wire.

4. A composite core as in claim 1 wherein said refractory metal element comprises at least one sheet.

5. A composite core as in claim 1 wherein said refractory metal element is embedded in said ceramic element.

6. A composite core as in claim 1 wherein said refractory metal element is attached to a surface of the ceramic element.

7. A composite core as in claim 6 wherein said attachment is a mechanical attachment.

8. A composite core as in claim 6 wherein said attachment is a chemical bond.

9. A mold-core assembly useful in the production of investment castings, having internal passages, which comprises:
   a composite core assembly including
   a) at least one ceramic element,
   b) at least one refractory metal element attached to a surface of at least one of said at least one ceramic elements, an external contour of the attached ceramic and refractory metal element corresponding essentially to a contour of a desired predetermined internal passage,
   c) a ceramic shell mold surrounding said core, and spaced away from said core to define a cavity,
   d) means in said shell mold for filling said cavity with molten metal.

10. An as cast article which comprises a cast superalloy body which contains a composite core captured within said superalloy body, said composite core comprising
   a) at least one ceramic element
   b) at least one refractory metal element attached to a surface of at least one of said ceramic elements, an external contour of the attached elements corresponding essentially to a contour of a desired predetermined internal passage along with gating and feeding elements.

11. A composite core for use in investment castings of superalloys, comprising at least one ceramic element and at least one refractory metal element, said core having at least a element having a dimension of less than about 0.015 inches, said at least one refractory metal element forming a portion of said composite core, and serving to define a passage in a superalloy investment casting.

12. A core for producing a superalloy investment casting including a refractory metal element forming a trailing edge of said core, and having an essentially triangular cross section.

13. A core and shell assembly for use in producing a superalloy investment casting including at least one refractory metal element attached to said core and to said shell, said at least one refractory metal element forming a portion of said composite core, and serving to define a passage in a superalloy investment casting.

14. A composite core for use in an investment casting process to produce an internal passage in an investment casting which comprises:

a) at least one ceramic element b) at least one refractory metal element attached to said at least one ceramic element, said at least one refractory metal element being coated with at least one oxidation resistant coating, said coated refractory metal element being formed, at least in part, from a sheet of refractory metal.

* * * * *